United States Patent [19]
Kriett

[11] 3,774,638
[45] Nov. 27, 1973

[54] MULTICHANNEL SLIDE VALVE

[75] Inventor: Walter Kriett, Hamburg, Germany

[73] Assignee: Blahm & Voss A G, Hamburg-Steinwerder, Germany

[22] Filed: Nov. 11, 1971

[21] Appl. No.: 197,803

[30] Foreign Application Priority Data
Dec. 18, 1970  Germany............. P 20 62 394.3

[52] U.S. Cl............................. 137/625.48, 251/325
[51] Int. Cl............................................ F16k 11/02
[58] Field of Search................. 137/625.48, 625.47, 137/625.46, 625.4; 251/324, 325

[56] References Cited
UNITED STATES PATENTS

| | | | |
|---|---|---|---|
| 2,965,351 | 12/1960 | Campbell | 251/325 X |
| 3,308,851 | 3/1967 | Zoludow | 137/625.48 |
| 3,643,700 | 2/1972 | Black | 137/625.68 |
| 2,360,733 | 10/1944 | Smith | 251/324 |
| 2,828,767 | 4/1958 | Barusch | 137/625.48 X |
| 2,921,603 | 1/1960 | Lofink | 137/625.38 |
| 3,263,961 | 8/1966 | Varga | 251/363 X |
| 3,335,999 | 8/1967 | Lowrey | 251/362 X |
| 3,406,705 | 10/1968 | Meyer | 251/325 X |
| 3,426,799 | 2/1969 | Kintner | 137/625.48 |
| 3,590,848 | 7/1971 | Svensson | 137/625.68 X |

FOREIGN PATENTS OR APPLICATIONS 1,369,195  6/1964  France............................ 137/625.48

Primary Examiner—Samuel Scott
Attorney—Hill, Sherman, Meroni, Gross & Simpson

[57] ABSTRACT

A multichannel slide valve whose valve casing has a bore forming a main channel in which an axially slidable sleeve valve is arranged for controlling flow openings in the wall of the casing which are in communication with two branch channels extending transversely to the main channel. The interior of the casing is provided with sealing rings of dovetail cross section arranged in correspondingly shaped dovetailed grooves which are spaced from the flow passages and engage the outer end portions of the sleeve valve, while a customary O-ring is arranged between the flow openings and engages the center portion of the sleeve valve.

3 Claims, 2 Drawing Figures

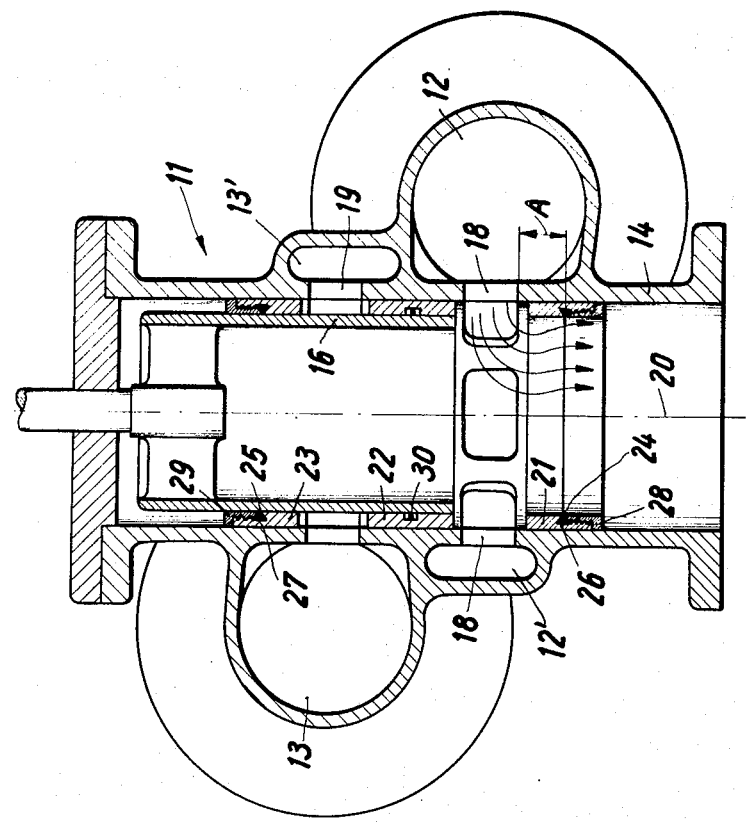
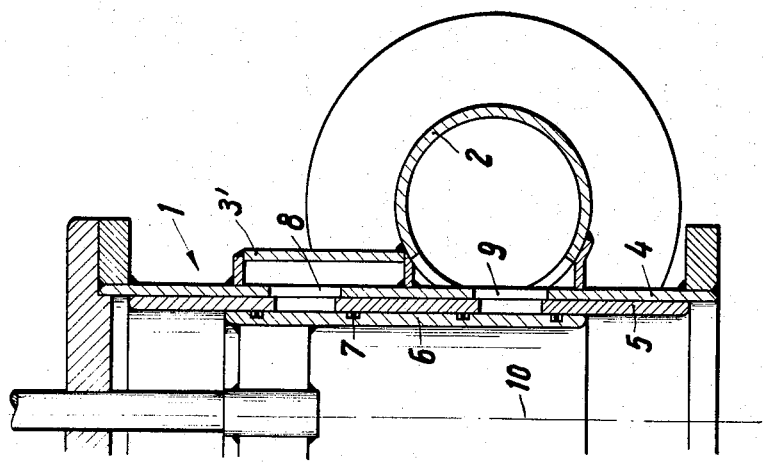

MULTICHANNEL SLIDE VALVE

The invention relates to a multichannel slide valve with an axially slidable sleeve valve which controls flow openings in the valve casing for connecting a main channel with one of two branch channels which extend transversely to the main channel arranged in the valve casing, whereby the slide valve is provided at its outer ends and between the flow openings with sealing rings for sealing the slide valve against the valve casing.

In a multichannel slide valve of the above-mentioned type the sealing rings which are arranged outside and between the flow openings comprise elastic O-rings seated in rectangular grooves of which the outer ones are arranged in the ends of the slide valve, while the inner sealing ring, which in none of the positions of the slide valve is exposed, is arranged in the wall of the valve casing.

Furthermore, it is known from a single-channel slide valve provided with an axially slidable outer slidable tube and an inner tube provided with an intermediate wall, at least one inner seal which in the open position of the valve is exposed, whereby this seal comprises an O-ring arranged in a dovetailed groove.

Such shutoff devices function in general only when they are operated during the time when no active flow is present in the valve. If, however, an adjustment of the shutoff device takes place when the flow medium is in movement, then it is possible that the sealing rings are pulled from their grooves. This has the result that the shutoff device becomes leaky in its interior.

It is also known to provide a multichannel slide valve with a slidable piston provided with elastic sealing rings which in cross-section have a dovetail configuration and are mounted in correspondingly shaped dovetail grooves provided in the slidable piston or in the wall of the valve casing. This construction provides, indeed, an increased safety against a tearing out of the sealing rings from their grooves, but it is not satisfactory when high flow velocities are encountered.

It is an object of the invention to provide a multichannel slide valve which is devoid of the above-mentioned disadvantages of the prior art valve constructions. The solution of the problem resides in the recognition that the flow forces which act vertically on the sealing rings have the tendency to wash the sealing rings from their seats and then the sealing rings are slidably removed from the slidable valve.

It is an object of the invention to arrange the outer sealing rings a sufficient distance away from the flow apertures of the valve and to arrange the sealing rings outside of the turbulent inlet zone of the walls of the valve casing, and that the sealing rings have in cross section a dovetail configuration and are arranged in grooves which have the same dovetail shape.

In accordance with the invention, the outer sealing rings are arranged at such a distance from the flow openings that the turbulence produced by the deflection of the fluid stream has subsided so that the outer sealing rings are engaged by an almost laminar stream whose washing action is much smaller than the vertical stream which heretofore surrounded both sides of the sealing ring, entered the groove under the ring, and washed the sealing rings from the groove.

In accordance with the invention the outer sealing rings are never moved past the flow openings so that they are not subjected to the washing action of the fluid stream.

Furthermore, the cross-sectional shape of the outer sealing rings provides an improved safety because the holding powers of the force closing attachment are greater than the adherent friction of the prior art construction.

The arrangement of the sealing rings of the invention in the walls of the casing has been suggested heretofore, but only as an alternative solution to the generally customary arrangement of the sealing rings on the circumference of the slide valve without, however, relating to the problem to be solved in the present invention.

A further embodiment of the invention consists in a simplification of the construction and resides in that the outer sealing rings are secured by means of inserted sleeves. In such a construction the wall of the valve requires solely to be provided with one-half of the dovetail groove, while the other half is formed by the inner end of the inserted sleeve. When the inserted sleeves are threaded into the wall of the valve casing, a very favorable assembly possibility is created and also a very good controllable pressing of the outer sealing rings into the dovetail grooves.

In accordance with the invention, the inner seal may comprise a single sealing ring in the form of an O-ring, because such a seal is constantly covered by the axially movable sleeve valve and therefore cannot be washed from its seat. Finally, the machining of the grooves for the sealing rings is simplified in that the sealing rings are arranged in individual short cylindrical sleeves and the later are secured in the valve casing, because the production of one-piece sleeves is difficult and is accompanied by a high amount of rejects.

In accordance with the invention, the short sleeves remain with their inner ends a short distance away from the edges of the flow openings, which means that the flow characteristics on these edges is improved and the danger is reduced that the outer sealing rings may be washed from their seats.

The invention will now be described in greater details with reference to the accompanying drawing in which:

FIG. 1 illustrates a sectional view of a multichannel slide valve of the prior art; and FIG. 2 illustrates a sectional view of the multichannel slide valve constructed in accordance with the present invention.

Referring to FIG. 1 which illustrates a multichannel slide valve of the prior art, the casing 1 of this valve is provided with two branch channels of which only one is illustrated and is designated by 2. The second branch channel is arranged substantially diagrammatically opposite to the branch channel 2 and FIG. 1 illustrates only a portion of the circulating channel 3'. The bore of valve casing formed by a wall 4 has inserted therein a one-piece sleeve 5 in which a slidably sleeve valve 6 provided with sealing rings 7 is inserted. In the illustrated position of the sleeve valve 6 the two branch channels are closed. The sleeve valve may be moved downwardly and upwardly, respectively, in order to expose one of the flow openings 8 so that one or the other of the two branch lines will be connected with the main channel formed by the bore of the casing 1. As illustrated in FIG. 1 in each case two each sealing rings 7 must by moved past one of the two flow openings 8 and 9, respectively. In this arrangement there exists the above-mentioned washout danger of the sealing rings. The axis of the main channel of the multichannel slide valve is designated by 10 and this axis constitutes also the axis of valve casing.

In FIG. 2 which discloses a multichannel slide valve in accordance with the invention, the valve casing 11 is provided with two branch channels 12 and 13 arranged on opposite sides of the valve casing 11. The valve casing is also provided with circulating channels 12' and 13'. The wall of the valve casing 11 is designated by 14 and the sleeve valve with 16. The valve casing 11 is provided with flow openings 18 and 19, and the main axis 20 of the valve casing 11 coincides with the axis of the main channel.

In accordance with the invention, the valve casing 11 has mounted therein three axially spaced sleeves 21, 22 and 23, all of the same diameter. These sleeves 21, 22 and 23 may—as shown—may be so rranged in the valve casing 11 that the inner ends of the same (see sleeves 21 and 23) are spaced somewhat from the flow openings 18 and 19. When this is done, the flow lines indicated at the right side of the sleeve 21 in FIG. 2 are favorably directed because the distance A of the outer sealing rings 24 and 25 from the outer edges of the flow apertures 18 and 19 is such that the turbulence does not reach the outer sealing ring 24. The outer sealing rings in the same manner as the inner sealing ring still to be described, may be arranged directly in grooves in the wall of the valve casing.

The outer sealing rings 24 and 25 have a dovetail cross section and are secured in grooves 26 and 27 which also are dovetailed in cross section. This is accomplished according to the embodiment illustrated in FIG. 2 by outer sleeves 28 and 29 which are threaded into the outer ends of the sleeves 21 and 23. The result is that the sealing rings 24 and 25 are pressed into the grooves 26 and 27 and are securely held in the same. This structure, in accordance with the invention, assures that none of the outer sealing rings 24 and 25 are moved past one of the flow openings 18 or 19.

The center sleeve 22 is provided in its inner wall with a single sealing ring 30 constructed as an O-ring. This sealing ring 30 is always covered by the slide valve 16 and therefore cannot be washed away by the fluid stream. For this reason, at this particular point in the valve of a simple O-ring is sufficient.

In the multichannel slide valve of the invention an adjustment of the same is also possible during the flow of the fluid stream and any leak within the valve is eliminated without interruption of the flow. A multichannel slide valve of the invention, therefore, can be used for much more applications and as the mentioned valves of the prior art.

What I claim is:

1. In a multiway slide valve, a main tubular conduit member constituting a valve chamber having a longitudinal axis coincident with that of said main conduit member; two secondary conduit members extending transversely of said main conduit member and separately communicating with said valve chamber through flow medium apertures in the wall of said main conduit member; a sleeve valve member in said valve chamber mounted for sliding movement axially of said main conduit member; annular grooves in the inner surface of said main conduit member, one of said grooves being disposed between said apertures and another one of said grooves being disposed outside of the annular region of said apertures at each side of said region in the axial direction of said main conduit member, said two last mentioned grooves being dovetail-shaped in cross-section; and an annular sealing ring in each of said annular grooves in sealing engagement with said sleeve valve member, each of the sealing rings in said dovetail-shaped grooves having a cross-sectional shape and size corresponding to the respective groove and being sufficiently remote from said apertures to be substantially unaffected by flow medium turbulence at the edges of said apertures, whereby tearing out of the sealing rings is prevented, said sealing rings disposed axially outside of the region of said apertures being firmly maintained in said grooves by means of bushings which form at least a portion of the axially outer wall of said grooves.

2. The multiway slide valve according to claim 1, in which said bushings are threadedly connected with said main conduit member.

3. The multiway slide valve according to claim 2, in which said sealing rings are disposed in separate cylindrical sleeves secured to the inside of said main tubular conduit member.

* * * * *